United States Patent [19]
Gaskins

[11] 3,824,026

[45] July 16, 1974

[54] CUTTING LEAD TIPS FOR DRILL BITS

[76] Inventor: Thomas Gaskins, Palmdale, Fla. 33944

[22] Filed: Mar. 19, 1973

[21] Appl. No.: 342,381

[52] U.S. Cl................. 408/210, 408/213, 408/227, 408/230
[51] Int. Cl............................................. B23b 51/02
[58] Field of Search ........... 408/210, 212, 213, 201, 408/209, 214, 225, 227, 230, 199

[56]  References Cited
UNITED STATES PATENTS
2,613,710  10/1952  Emmons............................ 408/213

Primary Examiner—Gil Weidenfeld
Attorney, Agent, or Firm—John E. Becker

[57] ABSTRACT

Improved drill bit lead end constructions which more particularly provide for sharp cutting lead or center point constructions to enhance the efficiency and effectiveness particularly of relative small diameter bits. The sharpened lead points include an axially disposed cutting edge which axially offsets a pair of inclined radial cutting edges which normally correspond to or are disposed upon the usual cone segment lips of a regular twist drill. One of the inclined radial cutting edges may be considered a hypotenuse relative to the axial cutting edge to thereby form a generally right triangular shape or profile to the lead end in some forms. Drill bits with these improved cutting lead ends provide at least a generally centering action while assuring essentially instantaneous cutting commencing from the initial contact of the drill bit with the material being drilled.

22 Claims, 23 Drawing Figures

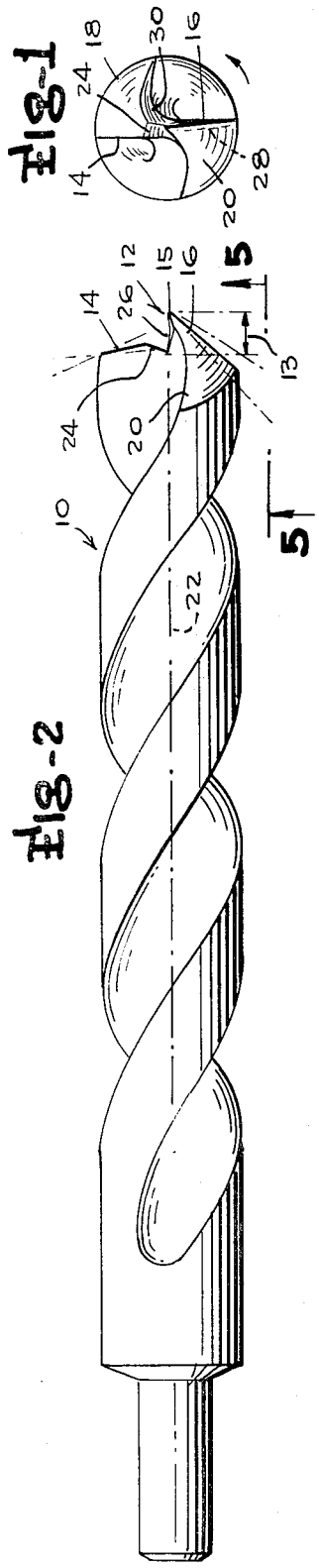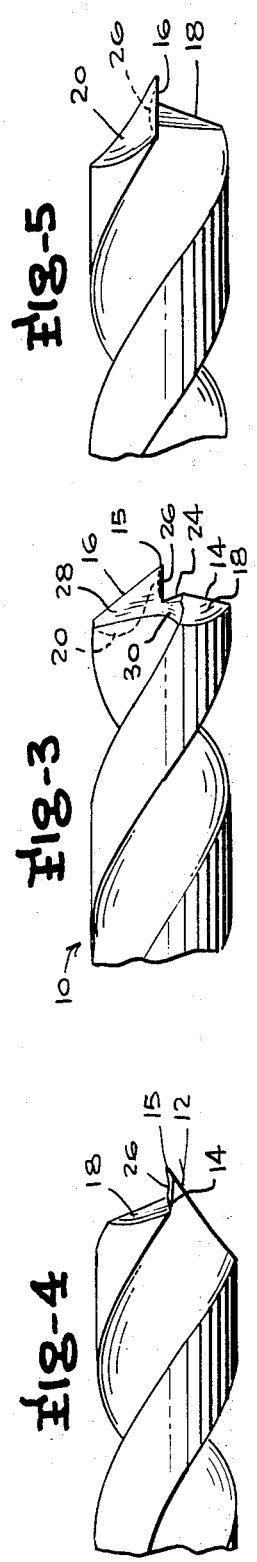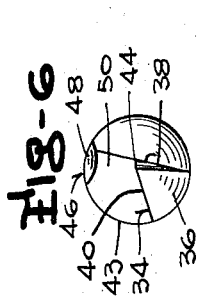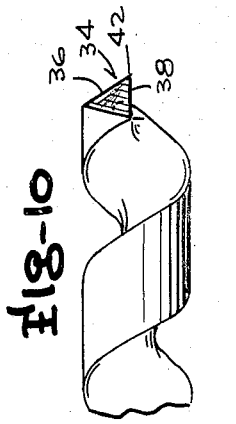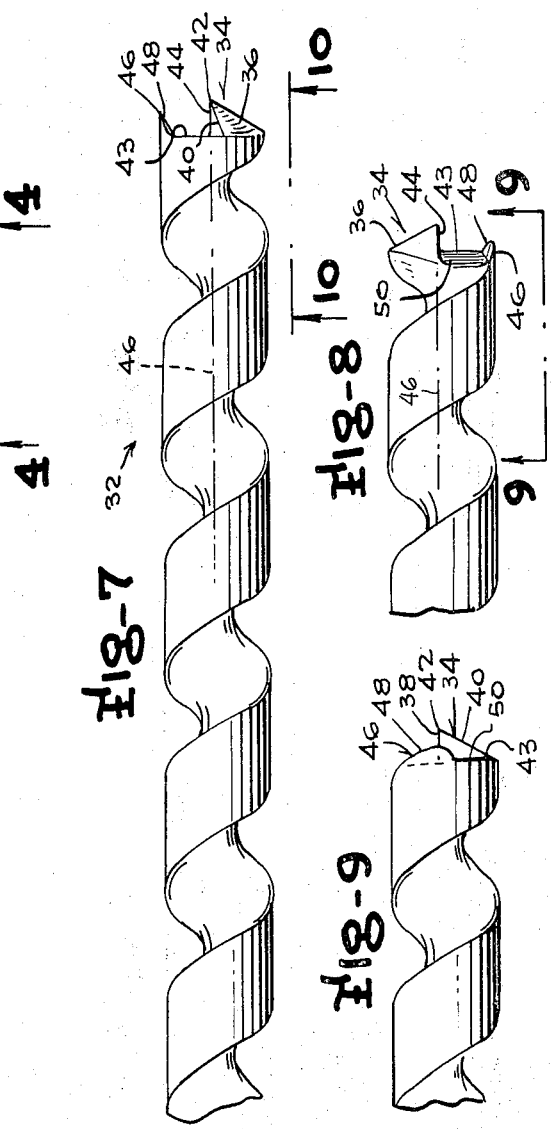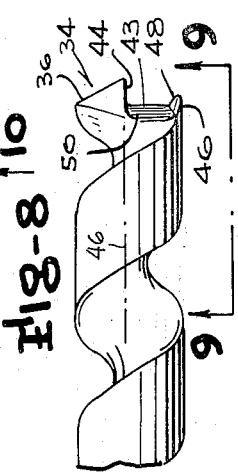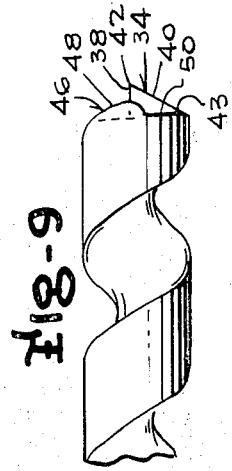

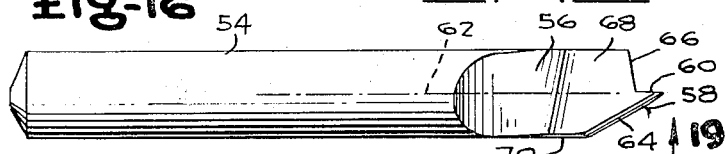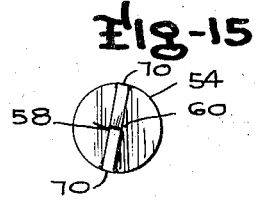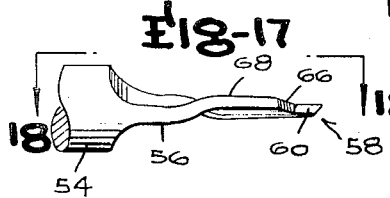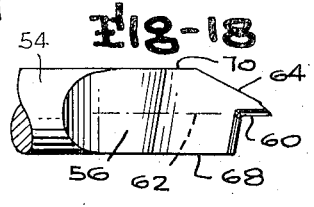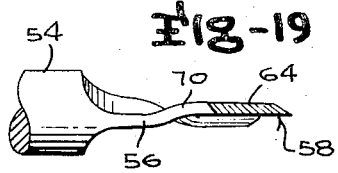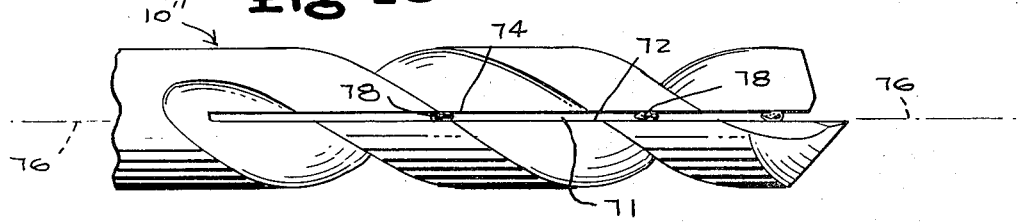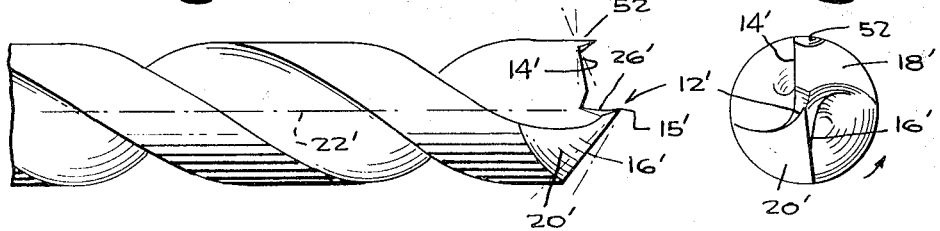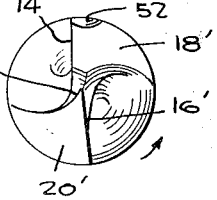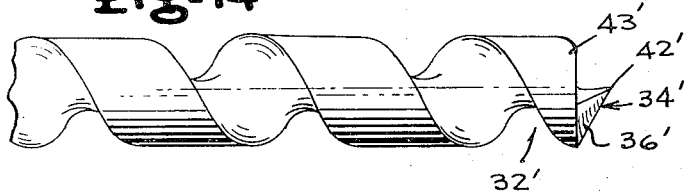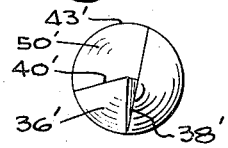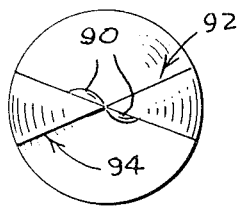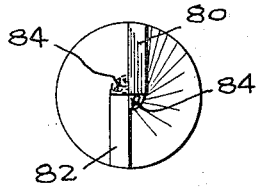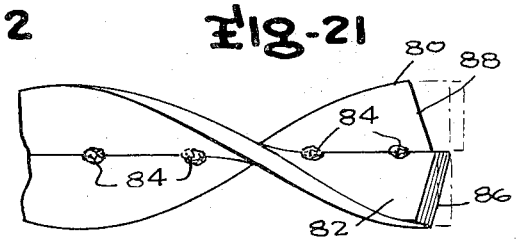

CUTTING LEAD TIPS FOR DRILL BITS

BACKGROUND OF THE INVENTION

This invention relates to improvements in augers or drill bits, including several special and unique novel forms of twist drill bits having cutting lead or center points which, while being especially useful in drilling of soft material such as wood, also are adaptable and more effective than previous bits of which I am aware for drilling in a variety of materials including metals.

All of the prior art bits of which I am aware embody generally pyramidal shaped brad or tapered screw type centering points which are not true cutting points, but which at best form a rough conical centering indentation. Because these prior art drill bits have non-cutting centering or lead points, they do not truly commence actual bore cutting until the full lead point is immersed in the material to be cut.

Also prior art bits embodying the more conventional tapering screw-threaded centering and lead point cause low density type materials, such as wood and the like, to crowd outwardly resulting in a binding against the chisel or scoring cutter or cutters, and subsequent cause splitting at the terminal end of the hole. Furthermore during end grain cutting such prior art bits not having true cutting points tend to have the point follow the grain or the softer summer growth lines and subsequently the bit does not tend to cut evenly through the harder winter growth lines of wood material. Moreover, prior bits, when working in low-density and otheryieldable materials, such as some woods, fiberboard, hardboard and the like, result in holes which often are not only rough but also prove to be of materially less diameter than that of the drill bit making the hole. This is because only part of the material displaced by the bit is removable by a true cutting and drilling action, with a substantial remaining part of material being radially outwardly compressed in rough edge fashion, whereby it springs back upon removal of the bit.

BRIEF SUMMARY OF THE INVENTION

Accordingly, it is among the the principal objects of this invention to provide novelly improved drill bits which overcome the aforementioned disadvantages and resulting defects attributable to prior art bits, and which provide substantially easier and more versatile and accurate sharpening thereof than prior art bits.

One such principal objective of this invention is to provide an improved lead end with a cutting point for various drill bit constructions, which tip facilitates actual cutting essentially upon initial contact with the material. The tip may be provided in several forms with lead or center points of a generally right angular and partial or segmented cone shape having cutting edges thereon which instantly upon contact initiate productive cutting by all metal portions of the drill excepting the infinitesimal needle point thereof.

Another main objective is to provide improved combination centering and cutting lead point formations adaptable not only to single twist but to all double twist type drill bits and augers, which are more effective to cut a large variety of metallic and non-metallic material by merely changing the bevel of the cutting edges, or lip relief angle to vary the slant of the point end, and which also start their productive cutting practically instantly from the time the bit touches the material.

Still a further principal objective is to provide improved drill bits of the foregoing character which avoid a tendency to wander while providing greatly improved cutting efficiency.

Yet a further object is to provide novelly improved drill bits of the above character which in some modifications thereof may be provided with an axially extended generally diametrical slot, dividing the body of the drill bit into two nearly identical longitudinal half portions which are subsequently rejoined in spaced apart but rigid relation at several axially spaced areas, thereby greatly facilitating more accurate sharpening of the bit even by novice sharpeners.

These and other objects and advantages will become more apparent from the following detailed description taken in conjunction with the illustrative drawing figures.

BRIEF DESCRIPTION OF THE DRAWINGS

FIGS. 1–5 relate to one preferred form of improved bit, wherein FIG. 1 is an end view of the penetrating or lead end of a twist drill bit having my novelly improved lead end;

FIG. 2 is a longitudinal elevational view of the bit taken from one side thereof;

FIG. 3 is a fragmentary elevational view of the lead end of the bit as viewed from the opposite side as that shown in FIG. 2;

FIG. 4 is a fragmentary view similar to FIG. 3 but viewed on line 4—4 of FIG. 3;

FIG. 5 is a view similar to FIGS. 3 and 4 but as viewed on line 5—5 of FIG. 2;

FIGS. 6–10 represent another preferred form of my invention, depicting a form of single twist wood auger or bit embodying another form of my improved cutting or lead end, wherein FIG. 6 is a lead end view thereof;

FIG. 7 is a longitudinal side elevational view of the modified embodiment;

FIG. 8 is a fragmentary elevational view of the lead end as viewed from the side opposite that shown in FIG. 7;

FIG. 9 is a fragmentary view similar to FIG. 8 but viewed on line 9—9 of FIG. 8;

FIG. 10 is a view also similar to FIGS. 8 and 9 but as viewed on line 10—10 of FIG. 7;

FIGS. 11 and 12 represent still a further modification of the drill bit basically shown in and corresponding to the FIGS. 1 and 2, having the addition of a cutting spur;

FIGS. 13 and 14 represent a modification of the bit shown in and corresponding to that in FIGS. 6 and 7, the difference basically residing in the omission of the cutting spur opposite the cutting lead point.

FIGS. 15–19 depict still a further wood auger or metal drill bit modification embodying my improved cutting tip end, wherein FIG. 15 is an end view thereof;

FIG. 16 is a longitudinal side elevational view of this further modification;

FIGS. 17, 18 and 19 are fragmentary elevational views taken respectively on the lines 17—17, 18—18 and 19—19 of this further embodiment;

FIG. 20 is a side elevational view of a modification of the bit shown in FIG. 2;

FIGS. 21 and 22 are end fragmentary perspective views which represent a further modification and/or process of making certain of the drill bits thereof; and FIG. 23 is an end view of still a further bit modification.

Reference will now be made in more detail to the illustrative drawings, and more particularly first to the drill bit embodiment of FIGS. 1–5. Like reference characters designate like parts throughout the several Figures, wherein 10 broadly designates the drill bit having a body which may be of any desired type, such as the spiral or twist drill type illustrated. The taper head or twist drill is extensively employed in wood boring because the greater part of the fluted portion of the drill can be ground away during resharpening thereof. It is usually very satisfactory for end grain drilling, and is even more so when made in accordance with this invention.

My novel improvement resides in the modification of the working end of the body portion, wherein in lieu of a conventional conical taper head, or the type using cone, spiral or brad type centering points, I provide a generally right angular shaped cutting lead point broadly designated 12. This point 12 is defined in part basically by a pair of longitudinally offset diametrically opposed cutting edges 14 and 16 provided on lead edges of the generally diametrically opposed and generally conical segment cutting lips designated 18 and 20 respectively. The cutting lips 18 and 20 in some embodiments may be of unequal angle and unequal length, as shown in this illustrative embodiment. However, in other embodiments they may be substantially of equal angle and length, although longitudinally offset from one another. The illustrated longer lip 20 and its cutting edge 16 together with the longitudinally offset axial distance 13 may constitute one generally right angular form thereof, terminating in point 15.

As shown, the height dimension 13 and point 15 of this generally right angle triangular cone segment are preferably exactly centered and coincident or coaxial with the center axis 22 of the drill body (FIG. 2). This height or length of axial cutting edge hereinafter described may be increased by the recessed notch-like cut 24 on the apex portion of the cutting edge 14 and lip 18. Additionally I prefer to provide a longitudinal or axial cutting edge 26 along the axial offset between cutting edges 14 and 16. The axial cutting edge 26 may be either linear or slightly arcuate form, the latter often inherently resulting from the spiral twist construction of the body. The cutting edge 16 is preferably hollow ground as depicted by the numeral 28 in FIG. 3. This hollow ground area preferably smoothly blends with additionally ground surface 30 (FIGS. 1 and 3) which bevels a portion of the cone segment lip 18, to form a throat to better facilitate entry of cut chips into the fluted areas of the drill bit.

While existing uniform taper head twist drill bits may be ground down to have the shape and resultant ability of this embodiment, it is understood that the bit would preferably be fabricated initially to embody the disclosed constructional features. Apart from the novel cutting point, the remainder of the drill bits may be of any other conventional construction.

Proceeding to the embodiment of FIGS. 7–10 inclusive, there is shown a somewhat different single spiral bodied auger broadly denoted 32, which also embodies a form of lead point area having a generally right angular conical quadrant shape denoted generally at 34. Lead point 34 includes a somewhat flatter cone segment lip 36 having a forwardly cutting edge 38 and optionally an opposite reverse cutting edge 40, which edges converge to meet at the apex point 42. A basic second cutting edge 43 is formed along the shallowly inclined periphery of the end portion of the bit. As in the previous embodiment, I prefer to provide an axial cutting edge 44 which corresponds to 26 in said previous embodiment. This cutting edge 44 is preferably coaxial with the axis 46 (FIG. 7) of the auger bit 32, but it may also be slightly inclined relative to the axis in some slightly modified forms. Generally opposite the cone segment lip 34 and at the end of the second basic cutting edge 43, I preferably provide a longitudinally extended tapered cutting spur 46 having an outer periphery and arcuate terminal cutting edge 48 coincident with the outermost periphery of the auger body. Spur 46 has its cutting edge terminate about midway between the point 42 and a generally flattened or shallowly inclined adjacent throat surface 50, the latter of which generally blends into the fluted portion of the bit.

The arrangement of this latter embodiment is such that the cutting lead point initiates both a centering and instantaneous center cutting upon initial rotative contact with the material, and shortly after cutting thereinto, the cutting edge 48 of the spur concurrently provides a circular scoring and outer peripheral cutting of the hole being bored. Cutting edges 38 and 43 are used to affect the basic boring. Due to the taper of the spur 46 and the blending inclined relationship of the throat surface 50 with the fluted portion of the auger, material being cut is forced or compressed inwardly toward the throat and axial center thereby eliminating any tendency of the material to be outwardly compressed against the peripheral wall of the hole being drilled. The shavings or cuttings are subsequently directed into the throat and along the fluted portion where such material is expelled from the hole in the usual manner.

In other contemplated embodiments of this preceding form either no spur at all need be used, as will be described more hereinafter, or alternatively, a second spur may be provided, particularly on bits of larger diameter. Such spurs and lip then would preferably be generally equally spaced circumferentially.

The first described embodiment may be modified to include a peripheral cutting spur 52, and is represented by the drawings FIGS. 11 and 12. In this modification, the bit 10' is essentially identical to that described relative to FIGS. 1–5, except for the addition of the spur 52. Primed reference numbers therefore are applied to designate the correspondinng parts and need not be otherwise described in detail. The spur 52 preferably commences at the outermost and lead edge of the cutting edge 14', and is otherwise preferably constructed and related in the same manner as the spur 46 of the FIG. 7 embodiment. Operation remains the same as before plus the stated advantage of the spur. Depending upon the slope of the taper head or lip relief angle, and the outer circumferential extent of the cone segment lip, a second spur (not shown) may be desired. In such a case the second spur would preferably have a similar arcuate cutting edge terminating at a line coplaner with the cutting edge of the first suggested spur 52.

As previously mentioned in relation to the drill bit of FIGS. 7–10, its spur 46 can be omitted completely, as shown in the modified form of FIGS. 13 and 14. Apart from the omission of the spur 46, the bit 32' remains the same as that described in relation to FIGS. 7-10. Corresponding but primed reference numbers have been applied to the corresponding parts herein and need not be further described.

Proceeding next to the bit depicted in FIGS. 15-19, there is shown a cylindrical shank and body 54 which is reduced to a thin flat web body portion 56 of slightly twisted configuration at its forward end. The lead end thereof is provided with a generally right triangular cutting point denoted generally at 58, of which the dimension or straight side 60 constituting the height of triangular profile or shape is provided with a beveled cutting edge is preferably co-existent with the longitudinal axis 62. The hypotenuse portion is provided with a beveled cutting edge 64 whose extent depends upon the taper angle of the point relative to the axis and aforesaid axial cutting edge 60. As shown, the triangular point is generally representative of a 30°-60°-right triangle whose hypotenuse cutting edge 64 terminates substantially below and at a longitudinal distance approximately twice the height of the axial cutting edge 60. Cutting edge 60 meets at its base end with the apex portion of a relatively flatly inclined further cutting edge 66. As in the previous embodiments, the lead or apex portions of the generally diametrically opposed cutting edges 64 and 66 are notable longitudinally or axially offset from one another. The degree of taper of the point may vary over a wide range, including having the two basic cutting edges 64 and 66 of the same inclination but offset as shown.

Due to the flattened web form of the lead end, the equivalent of the cone segment lips are represented by these respectively beveled cutting edges 64 and 66. In addition to cutting edges 60, 64, 66, the diametrically opposite longitudinal sides of the web portion of the body are also preferably provided with similarly beveled cutting edges 68 and 70. These cutting edges extend longitudinally a predetermined distance and blend into the continuous and sharp-angled edge of the remaining web portion. The twisted form of the leading portion of the body provides relatively shorter length flute portions to receive cuttings to be expelled from the hole. The generally right angular profile may also be considered to be defined by the angle between cutting edges 60 and 66, particularly when the edge 66 is disposed so shallowly as to be nearly flat or at right angles to the axial cutting edge 60. Also as in the previous drill bit forms, the angle of the taper head or cutting edges may be varied to suit and facilitate drilling into a large variety of different types of material. This particular drill bit when formed of the proper hardness steel, and within predetermined diameter sizes has performed exceptionally well in drilling holes into or through various metals including iron and steel. One example is a ¼ inch diameter bit readily drilling through ⅛ inch and more steel plates. These bits having the steeper points immediately form more pronounced centering holes which are initiated instantly upon rotative contact with the material being drilled.

Still another contemplated modification is that depicted in FIG. 20. It is contemplated that the various bits hereof may be fabricated so as to have a longitudinal medial slot disposed so that one wall is coexistent with a plane passing through the longitudinal axis thereof. The slot may extend from only a relatively short distance in from the lead in, or on up to nearly the full length of the body and shank. Such a centered disposition of the slot greatly facilitates more accurate sharpening by the pre-establishment of a true axial surface to be gauged upon or relative to when sharpening the bit. In some other contemplated embodiments an axially centered mark along the bit in lieu of a slot may also help facilitate sharpening relative to dead center.

In FIG. 20 there is shown for illustrative purposes a drill bit 10" which except for the slot 71 corresponds to the aforedescribed drill bit 10. The broadly designated slot 71 is provided with essentially parallel spaced walls 72 and 74. Wall 72 is seen to be co-existent with the longitudinal axis 76. Once the slot has been formed, the split portions are rejoined as by a plurality of spot welds 78, or any other suitable means, to rigidify the complete drill bit. Such a slot will also serve as an oil conduit when drilling in hard materials such as metals.

It is further contemplated that bits having my offset cutting edges may be fabricated in a manner such as shown in FIGS. 21 and 22, from two strips of flattened generally rectangular cross-section metal 80 and 82 twisted together and fused axially, either fully or by a plurality of axially spaced spot welds 84. A pair of longitudinal edges are disposed in generally tangentail relation to form an axial center portion of the bit. The lead end is then formed with either uniformly opposed or longitudinally offset opposed cutting edges, 86 and 88, preferably similar to the form depicted in FIGS. 15-19. The strips of metal may be of a more pronounced taper in cross-section, whereby the thinner edges are disposed at the axial center. The spot welding will strengthen these thinner contemplated edges, and excess metal would be filed away.

FIG. 23 is illustrative of the further use of auxiliary metal 90 transversely offset from each trailing edge of the longitudinally offset cutting edges 92 and 94, and adjacent the axis of the drill bit. The auxiliary metal pieces 90 as built up thereon add strength to the cutting lips and tapered cutting lead point. The added metal is disposed preferably so as to also help define the axial center of the bit to facilitate its being properly centered during sharpening.

It is apparent that the cutting lead points of all forms not only act as at least partial centering means, but also serve to reduce the force normally attendant drilling, thereby facilitating easier and substantially instantaneous cutting upon initial contact of the drill bit with the material being drilled. Therefore the objects and advantages as set forth in the preamble and throughout the specification have been satisfied, and are applicable to drills of all sizes.

While several illustrative and practical constructions have been disclosed by way of the accompanying drawings and foregoing detailed descriptions, other possible variations and modifications may be made by those skilled in the art without departing from the inventive spirit and scope as defined in the appended claims.

What is claimed is:

1. An improved drill bit comprising in combination a. a drill bit body including a portion of generally cylindrical shape;
   b. said body having a working end which is at least partially slightly fluted and provided with a generally right triangular profiled lead end point portion; an c. said lead end point portion including at least first and second sharpened cutting edges converging at an apex point on the center line axis of the drill body.

2. A drill bit as defined in claim 1, wherein one of said cutting edges is disposed substantially coaxial with the center line axis and constitutes a first cutting edge, and the other of said cutting edges constitutes the second edge and a hypotenuse portion of said right triangular profiled lead point, said hypotenuse portion extending radially to the outer periphery of said body.

3. A drill bit as defined in claim 2, wherein said working end is provided with a third cutting edge disposed generally diametrically opposite said hypotenuse cutting edge, said third cutting edge offset axially from said second cutting edge, said third cutting edge commencing at the base of said first cutting edge and extending radially to the outer periphery of said body.

4. A drill bit as defined in claim 2 wherein said working end portion of said body is of generally fluted cylindrical form, having a pair of generally diametrically opposite cone segment lips which have diametrically aligned tapering cutting edges one of which is constituted by said second cutting edge, and the other constituting a third cutting edge which is axially offset from said second cutting edge by the axial extent of said first cutting edge.

5. A drill bit as defined in claim 4 wherein said first axial cutting edge is elongated by an axially directed notch cut into said cone segment lip and a part of said third cutting edge and terminating adjacent a base end of said first and axial cutting edge and remote from the pointed apex lead end.

6. A drill bit as defined in claim 4 wherein said second and third cutting edges are of unequal taper relative to the center axis of said bit, and have different lip relief angles, and said second cutting edge is of hollow ground form to form an undercut leading cutting edge.

7. A drill bit as defined in claim 6 wherein said third cutting edge is also of undercut or hollow ground form, and the cone segment lip of the latter having a trailing edge which is ground to merge generally with said hollow ground portion of said second cutting edge and to facilitate directing cut material during drilling into said fluted portions of said body.

8. A drill bit as defined in claim 2 wherein said first cutting edge is of gently arcuately concave formation.

9. A drill bit as defined in claim 4 wherein said cone segment lip on which said third cutting edge is formed is of less pronounced cone-segment form and is axially recessed below that of the other on which said second cutting edge is formed, and said former-mentioned cone segment lip having a cutting spur of limited longitudinal extent formed thereon at the outer periphery, said spur being wider at its base and having an outer wall surface coextensive with the outer wall surface of said drill body, and having an inner wall surface tapering outwardly and terminating in a generally arcuate cutting edge on said outer wall periphery.

10. A drill bit as defined in claim 9 wherein the longitudinal extent of said spurs arcuate cutting edge is about half of the axial offset between said cone segment lips.

11. A drill bit as defined in claim 1 wherein said body is provided with a longitudinally extended and generally medially disposed slot to facilitate sharpening of said bit, and dividing said working end into generally two separate similar body portions.

12. A drill bit as defined in claim 11 wherein said slot is formed by a pair of spaced apart planar surfaces of the drill body, one of said planar surfaces being disposed in the plane of the axial center of said body.

13. A drill bit as defined in claim 12 further including means for rigidly holding said two separate similar body portions together in predetermined uniform form about the center axis thereof.

14. A drill bit as defined in claim 2 wherein said working end is provided with one cone segment lip portion on which said first and second cutting edges are disposed, and a circumferentially spaced third cutting edge on at least part of the outer periphery of the drill body.

15. A drill bit as defined in claim 14, wherein said third cutting edge includes in part at least one longitudinally extended cutting spur having an outer wall coextensive with the outer wall of said bit body, and having an inner wall intersecting with a generally transversely disposed, shallowly inclined intermediate wall blended into and forming part of said fluted portion of the drill bit; said cutting spur having a cutting edge directed toward and terminating short of said apex point of the lead end.

16. A drill bit as defined in claim 15, wherein said cutting spur has a cutting edge for cutting in both a forward and reverse rotation of the bit, and wherein said cone segment lip is provided with a trailing edge which merges with the said second cutting edge at the apex lead point end, said trailing edge having a sharpened edge to constitute a cutting edge during a reverse rotation of said bit.

17. A drill bit as defined in claim 2 wherein said working end portion of the bit includes a flattened web body.

18. A drill bit as defined in claim 3, wherein said working end portion of the bit includes a flattened web body of generally twisted formation to provide some fluted areas thereof and said three cutting edges are provided on said flattened web body portion.

19. A drill bit as defined in claim 18, further including additional cutting edge means constituted at least by one longitudinally extended outer peripheral web edge having a cutting surface generally parallel to said axial first cutting edge.

20. A drill bit as defined in claim 18, wherein said second and third cutting edges are of unequal taper toward the axis and lead point.

21. A novel lead end construction including a cutting lead point for various type and bodied drill bits and augers, said lead end construction comprising a generally right angular shaped profile with a first of three cutting edges disposed coaxially with the center axis of said bit and having a tip end and a base end; a second cutting edge constituting a hypotenuse portion of said right angular profile and merging with said axially disposed first cutting edge to constitute an apex tip end of the bit; and said third cutting edge commencing generally at the base of said first cutting edge, angling away from said center axis and extending to the outer periphery of the bit body generally diametrically opposite said second cutting edge, and in a longitudinally offset manner from said second cutting edge.

22. A novel drill bit construction comprising two longitudinally elongated members of flattened rectangular cross-section twisted and joined together in spiral-like formation and adjoined with a pair of opposed longitudinal edges disposed generally tangentially, a lead end provided with radially extended cutting edges tapering toward the bit center axis and disposed generally diametrically but longitudinally offset from one another, another cutting edge disposed substantially on the axial center of said bit and generally extending the length of the longitudinal offset between the first-mentioned cutting edges.

* * * * *